United States Patent
Takahashi et al.

(10) Patent No.: US 11,855,523 B2
(45) Date of Patent: Dec. 26, 2023

(54) POWER CONVERSION DEVICE

(71) Applicant: KABUSHIKI KAISHA YASKAWA DENKI, Fukuoka (JP)

(72) Inventors: Ryo Takahashi, Fukuoka (JP); Hideaki Ike, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 80 days.

(21) Appl. No.: 17/647,392

(22) Filed: Jan. 7, 2022

(65) Prior Publication Data

US 2022/0131493 A1 Apr. 28, 2022

Related U.S. Application Data

(63) Continuation of application No. PCT/JP2020/018340, filed on Apr. 30, 2020.

(30) Foreign Application Priority Data

Jul. 9, 2019 (JP) .................................. 2019-127534

(51) Int. Cl.
H02P 27/08 (2006.01)
H02M 1/00 (2006.01)
(Continued)

(52) U.S. Cl.
CPC ........... *H02M 1/007* (2021.05); *H02M 7/537* (2013.01); *H02P 27/08* (2013.01); *H02P 29/024* (2013.01); *H02M 7/06* (2013.01)

(58) Field of Classification Search
CPC ...... H02P 27/08; H02P 29/024; H02M 7/537; F04D 15/0254; F04D 15/0066; F04D 13/062; F04D 27/004
See application file for complete search history.

(56) References Cited

U.S. PATENT DOCUMENTS 4,647,919 A * 3/1987 Wright .................... G01F 1/698
340/606
5,819,202 A * 10/1998 Sato .................... G05B 19/4061
700/184
(Continued)

FOREIGN PATENT DOCUMENTS

CN 108426691 A 8/2018
EP 3879683 A1 9/2021
(Continued)

OTHER PUBLICATIONS

Office Action dated Dec. 20, 2022, for JP application No. 2021-530499.
(Continued)

*Primary Examiner* — Rina I Duda
(74) *Attorney, Agent, or Firm* — Colson Law Group, PLLC

(57) ABSTRACT

A power conversion device is provided, which includes a power conversion circuit configured to convert primary power to secondary power and supply the secondary power to a pump and a control circuit configured to cause the secondary power to follow a control command by the power conversion circuit the control circuit being configured to further execute evaluating, on the basis of the secondary power, an amplitude of a driving force of the pump, setting, on the basis of a relationship between an evaluation result of the amplitude and a driving speed of the pump, an amplitude threshold value profile indicating a relationship between an amplitude threshold value and the driving speed, and detecting an abnormality in the pump in response to the evaluation result of the amplitude exceeding the amplitude threshold value based on the amplitude threshold value profile.

6 Claims, 8 Drawing Sheets

(51) Int. Cl.
*H02M 7/537* (2006.01)
*H02P 29/024* (2016.01)
*H02M 7/06* (2006.01)

(56) References Cited

U.S. PATENT DOCUMENTS

| | | | |
|---|---|---|---|
| 5,999,873 A | | 12/1999 | Minowa et al. |
| 2017/0207733 A1* | | 7/2017 | Matsuyama ............ F04D 17/10 |
| 2018/0254685 A1 | | 9/2018 | Seki |
| 2020/0169205 A1 | | 5/2020 | Kinomura |

FOREIGN PATENT DOCUMENTS

| | | |
|---|---|---|
| JP | H06-165521 A | 6/1994 |
| JP | 9-100901 A | 4/1997 |
| JP | 2013-106377 A | 5/2013 |
| JP | 2015-81693 A | 4/2015 |
| JP | 2015 081693 A | 4/2015 |
| JP | 2018-148669 A | 9/2018 |
| JP | 2019-28765 A | 2/2019 |
| JP | 2019 028765 A | 2/2019 |

OTHER PUBLICATIONS

The extended European search report issued for foreign counterpart application No. 20835984.4, dated Jun. 26, 2023.

* cited by examiner

POWER CONVERSION DEVICE

CROSS REFERENCE TO RELATED APPLICATIONS

This application is the U.S. national stage application filed pursuant to 35 U.S.C. 365(c) and 120 as a continuation of International Patent Application No. PCT/JP2020/018340, filed Apr. 30, 2020, which application claims priority to Japanese Patent Application No. 2019-127534, filed Jul. 9, 2019, which applications are incorporated herein by reference in their entireties.

TECHNICAL FIELD

The present disclosure relates to a power conversion device, a pressure feed device, a power conversion method, a non-transitory computer-readable storage medium with a program stored thereon, a diagnosis device, and a diagnosis method.

BACKGROUND

JP H06-165521 A discloses an inverter device including a means for rapidly stopping the inverter device and outputting an alarm in a case in which an electric motor current output to an electric motor for driving a pump decreases and reaches a preset electric motor no-load current value, and the electric motor current does not increase even when a preset time elapses.

SUMMARY

The present disclosure provides a power conversion device, a pressure feed device, a power conversion method, a non-transitory computer-readable storage medium with a program stored thereon, a diagnosis device, and a diagnosis method effective in simplifying a configuration for detecting an abnormality in a driven object.

A power conversion device according to one aspect of the present disclosure includes a power conversion circuit configured to convert primary power to secondary power and supply the secondary power to a driven object and a control circuit configured to cause the secondary power to follow a control command by the power conversion circuit. The control circuit is configured to further execute evaluating, on the basis of the secondary power, an amplitude of a driving force of the driven object, setting, on the basis of a relationship between an evaluation result of the amplitude and a driving speed of the driven object, an amplitude threshold value profile indicating a relationship between an amplitude threshold value and the driving speed, and detecting an abnormality in the driven object in response to the evaluation result of the amplitude exceeding the amplitude threshold value based on the amplitude threshold value profile.

A pressure feed device according to another aspect of the present disclosure includes the power conversion device described above and a pump of an electrically powered type as the driven object.

A power conversion method according to yet another aspect of the present disclosure includes causing a secondary power to follow a control command by a power conversion circuit configured to convert primary power to the secondary power and supply the secondary power to a driven object, evaluating, on the basis of the secondary power, an amplitude of a driving force of the driven object, setting, on the basis of a relationship between an evaluation result of an amplitude and a driving speed of the driven object, an amplitude threshold value profile indicating a relationship between an amplitude threshold value and the driving speed, and detecting an abnormality in the driven object in response to the evaluation result of the amplitude exceeding the amplitude threshold value based on the amplitude threshold value profile.

A non-transitory computer-readable storage medium with a program stored thereon according to yet another aspect of the present disclosure is a non-transitory computer-readable storage medium with a program stored thereon, the program for causing a power conversion device to execute causing a secondary power to follow a control command by a power conversion circuit configured to convert primary power to the secondary power and supply the secondary power to a driven object, evaluating, on the basis of the secondary power, an amplitude of a driving force of the driven object, setting, on the basis of a relationship between an evaluation result of the amplitude and a driving speed of the driven object, an amplitude threshold value profile indicating a relationship between an amplitude threshold value and the driving speed, and detecting an abnormality in the driven object in response to the evaluation result of the amplitude exceeding the amplitude threshold value based on the amplitude threshold value profile.

A diagnosis device according to yet another aspect of the present disclosure is configured to execute evaluating, on the basis of power supplied to a driven object by a power conversion circuit, an amplitude of a driving force of the driven object, setting, on the basis of a relationship between an evaluation result of the amplitude and a driving speed of the driven object, an amplitude threshold value profile indicating a relationship between an amplitude threshold value and the driving speed, and detecting an abnormality in the driven object in response to the evaluation result of the amplitude exceeding the amplitude threshold value based on the amplitude threshold value profile.

A diagnosis method according to yet another aspect of the present disclosure includes evaluating, on the basis of power supplied to a driven object by a power conversion circuit, an amplitude of a driving force of the driven object, setting, on the basis of a relationship between an evaluation result of the amplitude and a driving speed of the driven object, an amplitude threshold value profile indicating a relationship between an amplitude threshold value and the driving speed, and detecting an abnormality in the driven object in response to the evaluation result of the amplitude exceeding the amplitude threshold value based on the amplitude threshold value profile.

According to the present disclosure, a power conversion device, a pressure feed device, a power conversion method, a non-transitory computer-readable storage medium with a program stored thereon, a diagnosis device, and a diagnosis method effective in simplifying a configuration for detecting an abnormality in a driven object can be provided.

DESCRIPTION OF EMBODIMENTS

An embodiment will be described in detail below with reference to the drawings. In the description, elements which are the same or have the same function are given the same reference signs, and redundant descriptions thereof are omitted.

Pressure Feed Device
Overall Configuration

Figure 1:
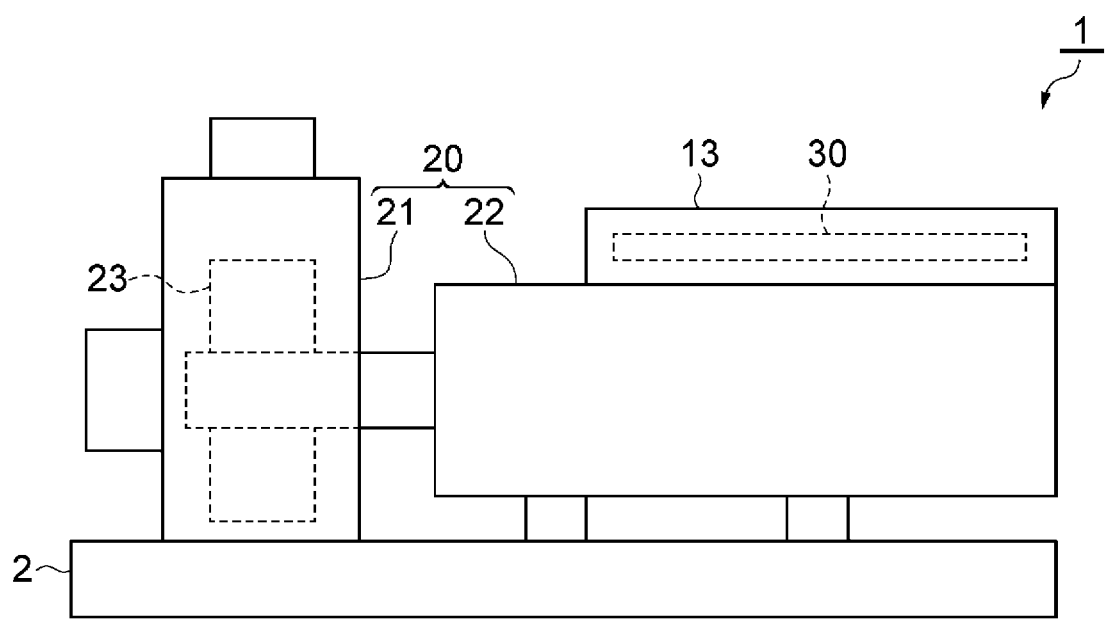
FIG. 1 is a side view of a pressure feed device.

A pressure feed device 1 illustrated in FIG. 1 includes a pump 20 (driven object) of an electrically powered type configured to pressure feed a liquid, a power conversion device 30, an electrical component holding unit 13, and a unit base 2 that holds these.

The pump 20 includes a pump body 21 and a motor 22 that drives the pump body 21. The pump body 21 is a non-positive displacement type rotary pump. For example, the pump body 21 is a centrifugal pump, such as a volute pump, and includes an impeller 23 that pressure feeds liquid by centrifugal force. Note that the pump body 21 may be a positive displacement type pump or a reciprocating pump, such as a diaphragm type or a bellows type. The pump body 21 may be any pump as long as a relationship between a driving speed and a driving force during steady operation is established. Specific examples of the motor 22 include a rotary synchronous electric motor or an inductive electric motor.

The power conversion device 30 converts power (primary power) of a power source 91 into driving power (secondary power) and supplies the secondary power to the motor 22. The forms of the primary power and the secondary power are not particularly limited. The primary power and the secondary power may be direct current or may be alternating current. As an example, the primary power and the secondary power are both three-phase alternating current.

The electrical component holding unit 13 is fixed to the motor 22 and holds the power conversion device 30. For example, the electrical component holding unit 13 is a case fixed to a frame outer periphery of the motor 22, and holds the power conversion device 30 in an interior thereof.

Power Conversion Device

Figure 2:
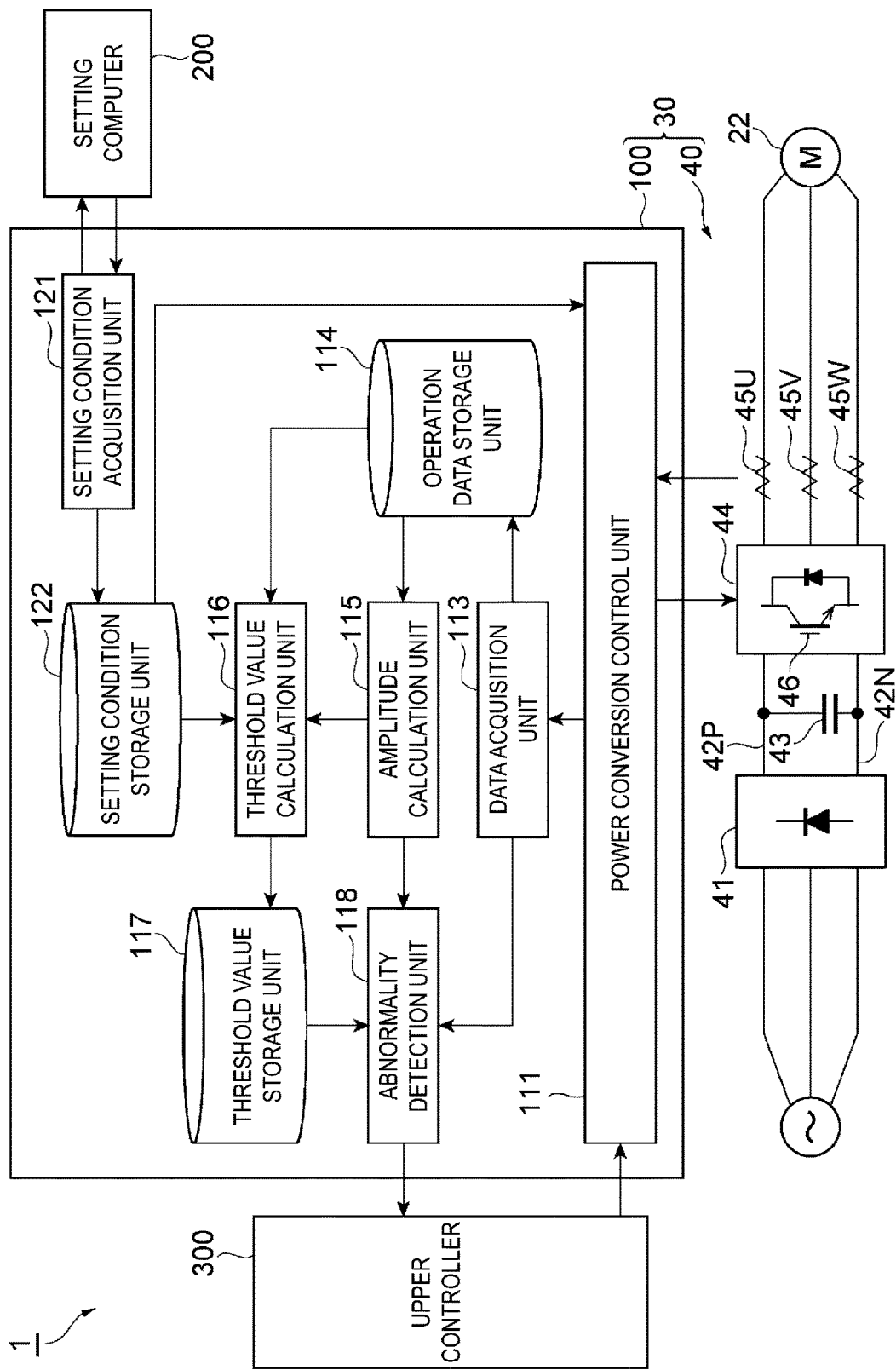
FIG. 2 is a block diagram illustrating a configuration of a power conversion device.

As illustrated in FIG. 2, the power conversion device 30 includes a power conversion circuit 40 and a control circuit 100. The power conversion circuit 40 converts the primary power into the secondary power and supplies the secondary power to the motor 22. For example, the power conversion circuit 40 includes a rectifier circuit 41, a capacitor 43, an inverter circuit 44, and current sensors 45U, 45V, 45W.

The rectifier circuit 41 is, for example, a diode bridge circuit or a pulse width modulation (PWM) converter circuit, and converts the primary power to direct current power and outputs the power to direct current bus bars 42P, 42N. The capacitor 43 smooths the direct current voltage between the direct current bus bars 42P, 42N. The inverter circuit 44 converts the direct current power of the direct current bus bars 42P, 42N into the secondary power and supplies the secondary power to the motor 22. For example, the inverter circuit 44 includes a plurality of switching elements 46, and converts the direct current power into the secondary power by switching the plurality of switching elements 46 on and off. Each of the switching element 46 is, for example, a power metal oxide semiconductor field effect transistor (MOSFET) or an insulated gate bipolar transistor (IGBT), and is switched on and off in accordance with a gate drive signal.

The current sensors 45U, 45V, 45W detect current flowing between the power conversion circuit 40 and the motor 22. For example, the current sensors 45U, 45V, 45W respectively detect alternating currents in a U phase, a V phase, and a W phase.

Note that the configuration of the power conversion circuit 40 is merely an example. The power conversion circuit 40 can be configured in any way as long as the primary power can be converted into the secondary power. For example, the power conversion circuit 40 may be a matrix converter that converts the primary power into the secondary power without the power being converted into direct current. Further, in a case in which the primary power is direct current power and the secondary power is alternating current power, the power conversion circuit 40 need not include the rectifier circuit 41. In a case in which the primary power is alternating current power and the secondary power is direct current power, the power conversion circuit 40 need not include the inverter circuit 44.

The control circuit 100 causes the secondary power to follow a control command by the power conversion circuit 40. Causing the secondary power to follow a control command includes causing a value correlated with the secondary power to follow a control command. For example, the control circuit 100 causes the power conversion circuit 40 to generate the secondary power so that a rotational speed of the motor 22 follows a speed command (control command). As an example, the control circuit 100 generates a driving force command value for causing the rotational speed of the motor 22 to follow the speed command, and causes the power conversion circuit 40 to generate the secondary power so as to make the motor 22 generate a driving force corresponding to the driving force command value. Note that the control circuit 100 may acquire the speed command from an upper controller 300, or may internally retain a preset speed command. Specific examples of the upper controller 300 include a programmable logic controller.

The control circuit 100 is configured to further execute evaluating, on the basis of the secondary power, an amplitude of the driving force of the pump 20, setting, on the basis of a relationship between an evaluation result of the amplitude and a driving speed of the pump 20, an amplitude threshold value profile indicating a relationship between an amplitude threshold value and the driving speed, and detecting an abnormality in the pump 20 in response to the evaluation result of the amplitude exceeding the amplitude threshold value based on the amplitude threshold value profile.

For example, in the control circuit 100, the driving force of the pump 20 for which the amplitude threshold value profile is set on the basis of the relationship between the evaluation result of the amplitude in a state in which no abnormality has occurred in the pump 20 (hereinafter referred to as "normal amplitude") and the driving speed of the pump 20 is a driving force imparted to the pump body 21 by the motor 22, for example. The driving speed of the pump 20 is the driving speed of the pump body 21 caused by the motor 22.

The control circuit 100 may set the amplitude threshold value profile by adding a margin that changes in accordance with the driving speed to the normal amplitude, or may set the amplitude threshold value profile by multiplying the normal amplitude by a magnification that changes in accordance with the driving speed.

The control circuit 100 may set the amplitude threshold value profile as discrete data. For example, the control circuit 100 may set, as the amplitude threshold value profile, a plurality of amplitude threshold values respectively corresponding to a plurality of reference speeds. When the driving speed is positioned between two of the reference speeds, the control circuit 100 may calculate an amplitude threshold value corresponding to the driving speed by interpolation of the two amplitude threshold values respectively corresponding to the two reference speeds.

The control circuit 100 may evaluate an amplitude of the driving force while increasing the driving speed, set the plurality of reference speeds by setting, as the reference speed, the driving speed when an increasing or decreasing trend in the evaluation result of the amplitude in accordance with the increase in the driving speed is reversed, and set the plurality of amplitude threshold values respectively corresponding to the plurality of reference speeds.

The control circuit 100 may be configured to acquire force data indicating the driving force on the basis of the secondary power, and evaluate the amplitude of the driving force on the basis of an amplitude of the force data. For example, the force data are data that uniquely identify the driving force. Specific examples of the force data include command values or detected values of values of current flowing between the power conversion circuit 40 and the motor 22 (for example, values detected by the current sensors 45U, 45V, 45W). The force data may be command values (for example, the driving force command values described above) generated by the control circuit 100 to control the pump 20.

The control circuit 100 may acquire force data indicating the driving force on the basis of the secondary power, and evaluate the amplitude of the driving force on the basis of a difference between the force data and a trend value of a plurality of the force data acquired from a predetermined time before an acquisition time of the force data to the acquisition time.

As an example, the control circuit 100 includes, as a functional configuration (hereinafter referred to as "functional block"), a power conversion control unit 111, a data acquisition unit 113, an operation data storage unit 114, an amplitude calculation unit 115 (amplitude evaluation unit), a threshold value calculation unit 116, a threshold value storage unit 117, and an abnormality detection unit 118.

The power conversion control unit 111 controls the power conversion circuit 40 so as to cause the secondary power to follow a control command on the basis of the detected values of the current sensors 45U, 45V, 45W. For example, the power conversion control unit 111 causes the power conversion circuit 40 to generate the secondary power so as to cause the rotational speed of the motor 22 to follow the speed command acquired from the upper controller 300, a preset speed command, or the like. As an example, the control circuit 100 generates a driving force command for causing the rotational speed of the motor 22 to follow the speed command, and causes the power conversion circuit 40 to generate the secondary power so as to make the motor 22 generate a driving force corresponding to the driving force command.

The power conversion control unit 111 may execute power conversion control in a scan mode for setting the amplitude threshold value described above, and power conversion control in a normal mode for operating the pump 20 for the purpose of pressure feeding the liquid. During power conversion control in scan mode, the power conversion control unit 111 causes the power conversion circuit 40 to generate the secondary power so as to cause the rotational speed of the motor 22 to follow the gradually increasing speed command. "Gradually increasing" includes increasing stepwise. During power conversion control in normal mode, the power conversion control unit 111 causes the power conversion circuit 40 to generate the secondary power so as to cause the rotational speed of the motor 22 to follow the speed command for normal operation.

The data acquisition unit 113 acquires the force data described above and speed data indicating the driving speed. The speed data may be any data as long as the data uniquely specify the driving speed. For example, the data acquisition unit 113 acquires the detected values of the current sensors 45U, 45V, 45W from the power conversion control unit 111 as the force data. Further, the data acquisition unit 113 acquires the value of the speed command from the power conversion control unit 111 as the speed data. The operation data storage unit 114 stores the data acquired by the data acquisition unit 113 in a time series manner.

The amplitude calculation unit 115 evaluates the driving force on the basis of the force data. For example, the amplitude calculation unit 115 calculates, on the basis of the data stored by the operation data storage unit 114, the amplitude of a vibration component of the force data as an evaluation result of the amplitude of the driving force. For example, the amplitude calculation unit 115 calculates an amplitude of the vibration component of the force data on the basis of the plurality of force data acquired from a predetermined time before an acquisition time of the force data to the acquisition time.

The amplitude may be a width from a negative peak to a positive peak or may be half the width from the negative peak to the positive peak. The vibration component is a vibration component of the force data during steady operation of the pressure feed device 1. "Steady operation" refers to an operating state in which the pump body 21 is filled with a liquid to be pressure fed (hereinafter simply referred to as "liquid"), and the driving speed of the pump 20 substantially matches a target speed. "Substantially matches" means that a difference between the driving speed and the target speed is within a negligible error range. The amplitude may be determined, for example, from a difference between a maximum value and a minimum value within a predetermined time, or can be derived by fast Fourier transform (FFT) or the like. For example, the amplitude calculation unit 115 may derive an amplitude of a predetermined frequency component by FFT, or may derive an average value, a maximum value, or the like of the amplitudes of the frequency component in a predetermined bandwidth.

The amplitude calculation unit 115 may calculate, as the evaluation result of the amplitude of the driving force, a difference between the force data and the trend value of the plurality of force data acquired from a predetermined time before an acquisition time of the force data to the acquisition time. For example, the amplitude calculation unit 115 performs low-pass filtering using past force data on the most recent force data in the operation data storage unit 114 to calculate the trend value.

Specific examples of the low-pass filtering include filtering of a finite impulse response type. In a case in which primary filtering of a finite impulse response type is used, the trend value is derived by the following equation:

$$Y = A \cdot X[k] + (1-A) \cdot X[k-1] \qquad (1)$$

Y: Trend value
X[k]: Most recent force data
X[k−1]: Force data acquired one acquisition prior
A: Filter coefficient In a case in which secondary filtering of a finite impulse response type is used, the trend value is derived by the following equation:

$$Y=A \cdot X[k]+B \cdot X[k-1]+(1-A-B) \cdot X[k-2] \quad (2)$$

Y: Trend value
X[k]: Most recent force data
X[k−1]: Force data acquired one acquisition prior
X[k−2]: Force data acquired two acquisitions prior
A, B: Filter coefficient Note that the amplitude calculation unit 115 does not necessarily need to use the most recent force data in the calculation of the trend value, and may calculate the trend value on the basis of past force data alone. For example, the X[k] described above may be force data acquired a few acquisitions (for example, one acquisition) prior to the most recent acquisition.

The threshold value calculation unit 116 sets the amplitude threshold value profile described above on the basis of a relationship (hereinafter referred to as "normal amplitude profile") between the evaluation result of the amplitude in a state in which no abnormality has occurred in the pump 20 ("normal amplitude" described above), and the driving speed of the pump 20. The threshold value storage unit 117 stores the amplitude threshold value profile set by the threshold value calculation unit 116. Note that, once the amplitude threshold value profile is stored, the same profile may be reused in other power conversion devices 30 of the same type. For example, the amplitude threshold value profile stored by the threshold value storage unit 117 may be copied to the threshold value storage unit 117 of another power conversion device 30.

For example, the threshold value calculation unit 116 sets the amplitude threshold value profile described above by adding a predetermined margin to the normal amplitude profile described above. The threshold value calculation unit 116 may set the amplitude threshold value profile by adding a margin that changes in accordance with the driving speed to the normal amplitude profile. As a result, the amplitude threshold value profile is set so that a difference between the amplitude threshold value and the normal amplitude changes in accordance with the driving speed. For example, the margin described above may be set so that the difference between the amplitude threshold value and the normal amplitude increases as the driving speed increases, or may be set so that the difference between the amplitude threshold value and the normal amplitude increases as the normal amplitude increases.

The threshold value calculation unit 116 may set the amplitude threshold value profile described above by multiplying the normal amplitude profile described above by a predetermined magnification. The threshold value calculation unit 116 may set the amplitude threshold value profile by multiplying the normal amplitude profile by a magnification that changes in accordance with the driving speed. As a result, the amplitude threshold value profile is set so that the magnification of the amplitude threshold value with respect to the normal amplitude changes in accordance with the driving speed. For example, the magnification described above may be set so as to increase as the driving speed increases, or may be set so as to increase as the normal amplitude increases. The threshold value calculation unit 116 may set, as the amplitude threshold value profile, a plurality of amplitude threshold values respectively corresponding to a plurality of reference speeds.

Figure 3A:
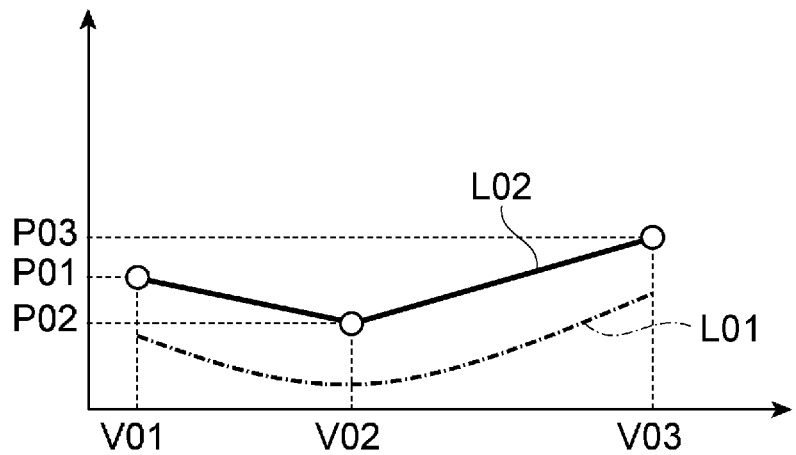
FIGS. 3A, 3B, and 3C are graphs showing threshold value lines.
Figure 3B:
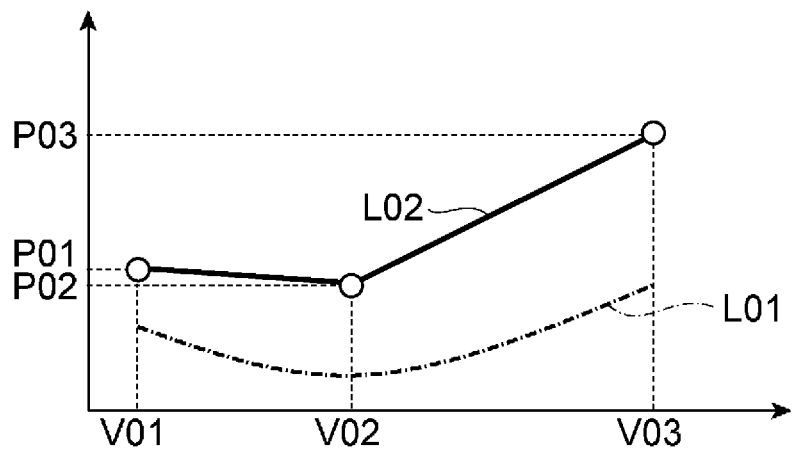
Figure 3C:
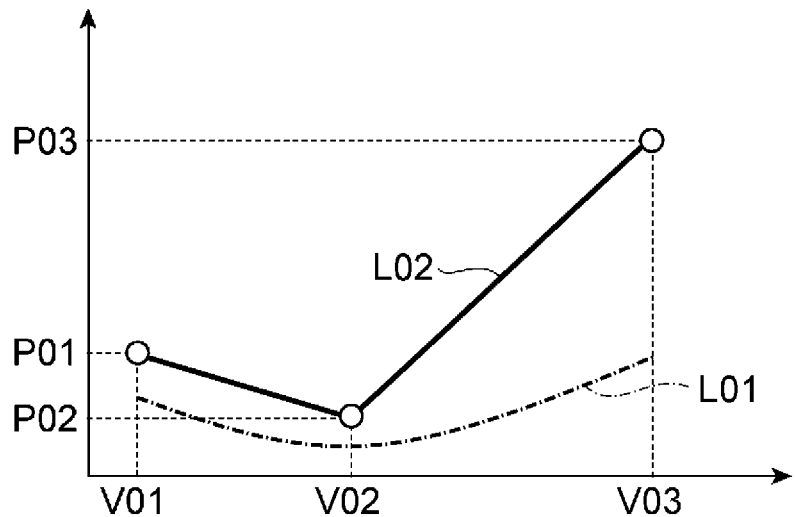

FIGS. 3A, 3B, and 3C are graphs showing setting examples of the amplitude threshold value profile. A line L01 is the normal amplitude profile. As shown by the line L01, when the normal amplitude profile is convex in a negative direction of the amplitude, the threshold value calculation unit 116 may set the amplitude threshold value profile so as to be convex in the negative direction of the amplitude.

For example, the threshold value calculation unit 116 calculates amplitude threshold values P01, P02, P03 by adding a predetermined margin to the amplitude threshold values respectively corresponding to a plurality of reference speeds V01, V02, V03. FIG. 3A shows a case in which the margin described above is constant, and FIG. 3B shows a case in which the margin is set so as to increase as the driving speed increases.

For example, the threshold value calculation unit 116 may calculate the amplitude threshold values P01, P02, P03 by multiplying the amplitude threshold values respectively corresponding to the plurality of reference speeds V01, V02, V03 by a predetermined magnification. FIG. 3C shows a case in which the magnification described above is set so as to increase as the driving speed increases.

As described below, in a case in which the driving speed is positioned between two reference speeds, the amplitude threshold value corresponding to the driving speed is set by linear interpolation of the two amplitude threshold values respectively corresponding to the two reference speeds. In a case in which the amplitude threshold values P01, P02, P03 are used in this way, setting the amplitude threshold values P01, P02, P03 corresponds to setting the amplitude threshold value profile of a line L02 connecting these with a straight line or an approximate curve.

The threshold value calculation unit 116 may set at least one of the plurality of reference speeds by setting, as the reference speed, the driving speed when, in a process in which the driving speed gradually increases due to the control command setting in scan mode described above, an increasing or decreasing trend of the normal amplitude in accordance with the increase in the driving speed is reversed (hereinafter, referred to as the "reverse speed").

As an example, in FIGS. 3A, 3B, and 3C, the threshold value calculation unit 116 sets a minimum speed in a predetermined speed range as the reference speed V01, a maximum speed in the speed range as the reference speed V03, and the reverse speed as the reference speed V02. Note that the speed range is preset on the basis of the range and the like of the speed command in the control command setting in normal mode described above.

The reverse speed may be the speed at the moment when the increasing or decreasing trend is reversed, or may be the speed immediately before or immediately after that moment. For example, the threshold value calculation unit 116 may use, as the reverse speed, the speed at the moment when the reversal of the increasing or decreasing trend is detected. The reversal of the increasing or decreasing trend is detected later than the moment when the reversal of the increasing or decreasing trend occurs. Thus, the threshold value calculation unit 116 may use, as the reverse speed, the speed at a predetermined time before the moment when the reversal of the increasing or decreasing trend is detected.

The abnormality detection unit 118 detects an abnormality in the pump 20 in response to the amplitude threshold value based on the amplitude threshold value profile exceeding the evaluation result of the amplitude. For example, the abnormality detection unit 118 sets an amplitude threshold value (hereinafter referred to as "current amplitude threshold value") on the basis of the speed data acquired by the data acquisition unit 113 and the amplitude threshold value profile stored by the threshold value storage unit 117. The abnormality detection unit 118 compares the evaluation result of the amplitude calculated by the amplitude calculation unit 115 (hereinafter referred to as "current amplitude") to the current amplitude threshold value, and detects an abnormality in the pump 20 in a case in which the current amplitude exceeds the current amplitude threshold value. The abnormality detection unit 118 may output the result of abnormality detection to the upper controller 300, a display device, or the like.

The control circuit 100 may be configured to further execute setting calculation criteria of the amplitude threshold value based on the normal amplitude for each of the driving speeds on the basis of a user setting, and may be configured to set the amplitude threshold value profile on the basis of the normal amplitude for each of the driving speeds and the calculation criteria for each of the driving speeds. For example, the control circuit 100 further includes a setting condition acquisition unit 121 and a setting condition storage unit 122.

The setting condition acquisition unit 121 acquires setting conditions of the amplitude threshold value profile including the calculation criteria described above. For example, the setting conditions include a minimum speed and a maximum speed of the speed range described above and the calculation criteria described above within the speed range. Specific examples of the calculation criteria include the margin described above or the magnification described above.

For example, the setting condition acquisition unit 121 causes a setting computer 200 to display an input screen of the setting conditions, and acquires the setting conditions input to the input screen by a user. The setting condition storage unit 122 stores the setting conditions acquired by the setting condition acquisition unit 121. Specific examples of the setting computer 200 include a personal computer having a communication function with the control circuit 100.

Figure 4:
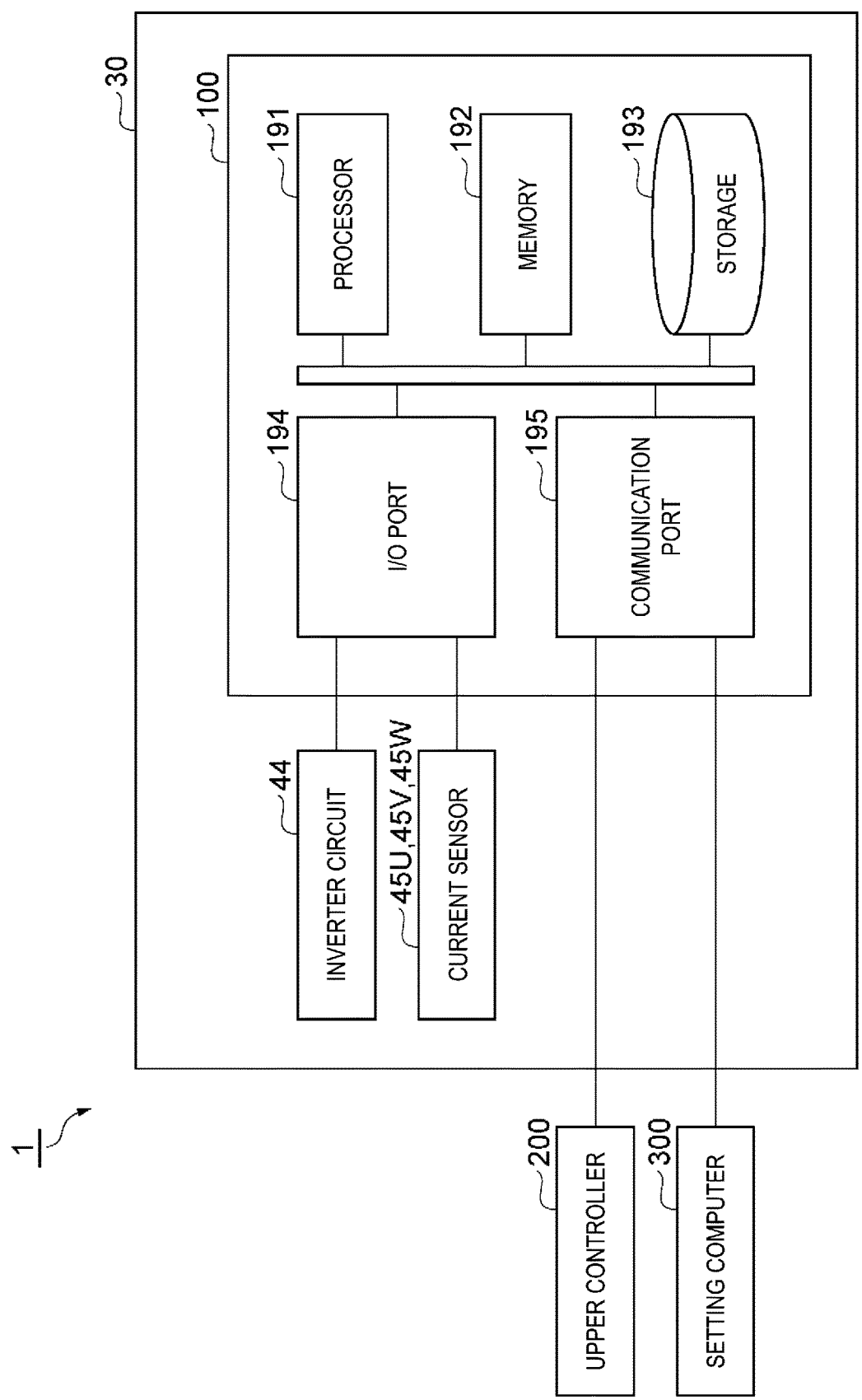
FIG. 4 is a hardware configuration diagram of a control circuit.

FIG. 4 is a block diagram illustrating a hardware configuration of the control circuit 100. As illustrated in FIG. 4, the control circuit 100 includes one or a plurality of processors 191, a memory 192, a storage 193, an I/O port 194, and a communication port 195. The storage 193 includes a computer-readable storage medium such as a non-volatile semiconductor memory, for example. The storage 193 stores a program for causing the power conversion device 30 to execute causing the secondary power to follow the control command by the power conversion circuit 40 configured to convert the primary power to the secondary power and supply the secondary power to the pump 20, evaluating, on the basis of the secondary power, an amplitude of the driving force of the pump 20, setting, on the basis of a relationship between an evaluation result of the amplitude and a driving speed of the pump 20, an amplitude threshold value profile, and detecting an abnormality in the pump 20 in response to the evaluation result of the amplitude exceeding the amplitude threshold value based on the amplitude threshold value profile.

The memory 192 temporarily stores programs loaded from the storage medium of the storage 193 and calculation results from the processor 191. The processor 191 implements each functional block of the control circuit 100 by executing the program described above in cooperation with the memory 192. The I/O port 194 includes a terminal block of an input power source and inputs/outputs electric signals between the inverter circuit 44 and the current sensors 45U, 45V, 45W in accordance with commands from the processor 191. The communication port 195 performs information communication with the setting computer 200 and the upper controller 300 in accordance with commands from the processor 191.

Note that, in the control circuit 100, the functions are not limited to being implemented by a program. For example, the control circuit 100 may implement at least one function by a dedicated logic circuit or an application specific integrated circuit (ASIC) integrated therewith.

Power Conversion Procedure

Next, as an example of the power conversion method, an example of a control procedure executed by the control circuit 100 will be described. This control procedure includes causing the secondary power to follow the control command by the power conversion circuit 40 configured to convert the primary power to the secondary power and supply the secondary power to the pump 20, evaluating, on the basis of the secondary power, an amplitude of a driving force of the pump 20, setting, on the basis of a relationship between an evaluation result of the amplitude and a driving speed of the pump 20, an amplitude threshold value profile, and detecting an abnormality in the pump 20 in response to the evaluation result of the amplitude exceeding the amplitude threshold value based on the amplitude threshold value profile. This procedure will be described in detail below by dividing the procedure into a procedure for acquiring the setting conditions of the amplitude threshold value profile, a procedure for setting the amplitude threshold value profile, and a procedure for operating the pump 20.

Setting Condition Acquisition Procedure

Figure 5:
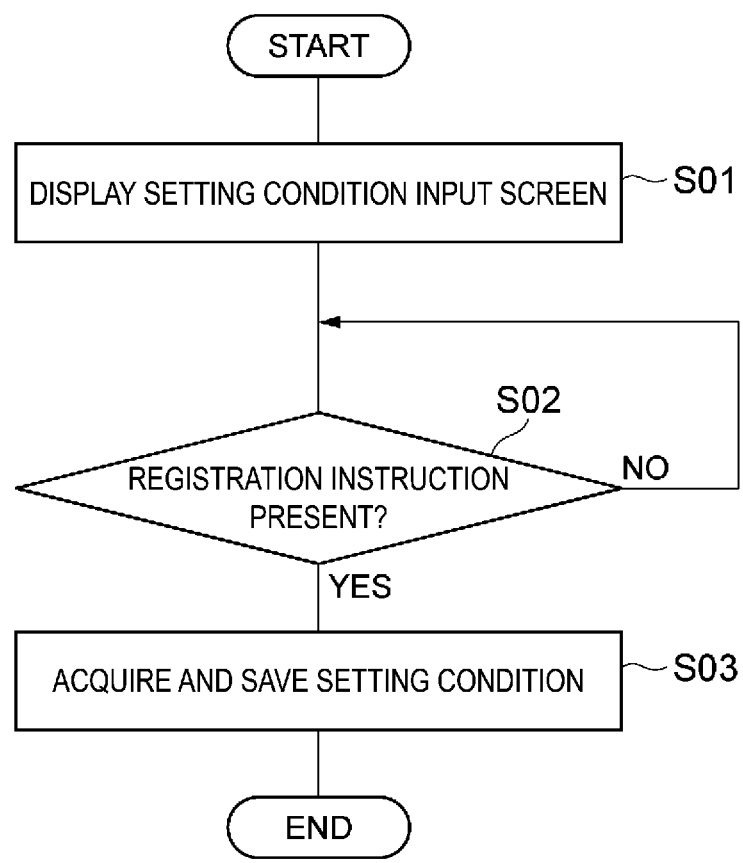
FIG. 5 is a flowchart illustrating an acquisition procedure of a setting condition of a threshold value.

As illustrated in FIG. 5, the control circuit 100 executes steps S01, S02, S03. In step S01, the setting condition acquisition unit 121 causes the setting computer 200 to display a setting condition input screen. In step S02, the setting condition acquisition unit 121 waits for a registration instruction input (for example, clicking of a registration button) on the setting condition input screen. In step S03, the setting condition acquisition unit 121 acquires setting conditions based on the content input into the setting condition input screen, and saves the setting conditions in the setting condition storage unit 122. Thus, the setting condition acquisition procedure for the amplitude threshold value is completed.

Setting Procedure for Amplitude Threshold Value Profile

Figure 6:
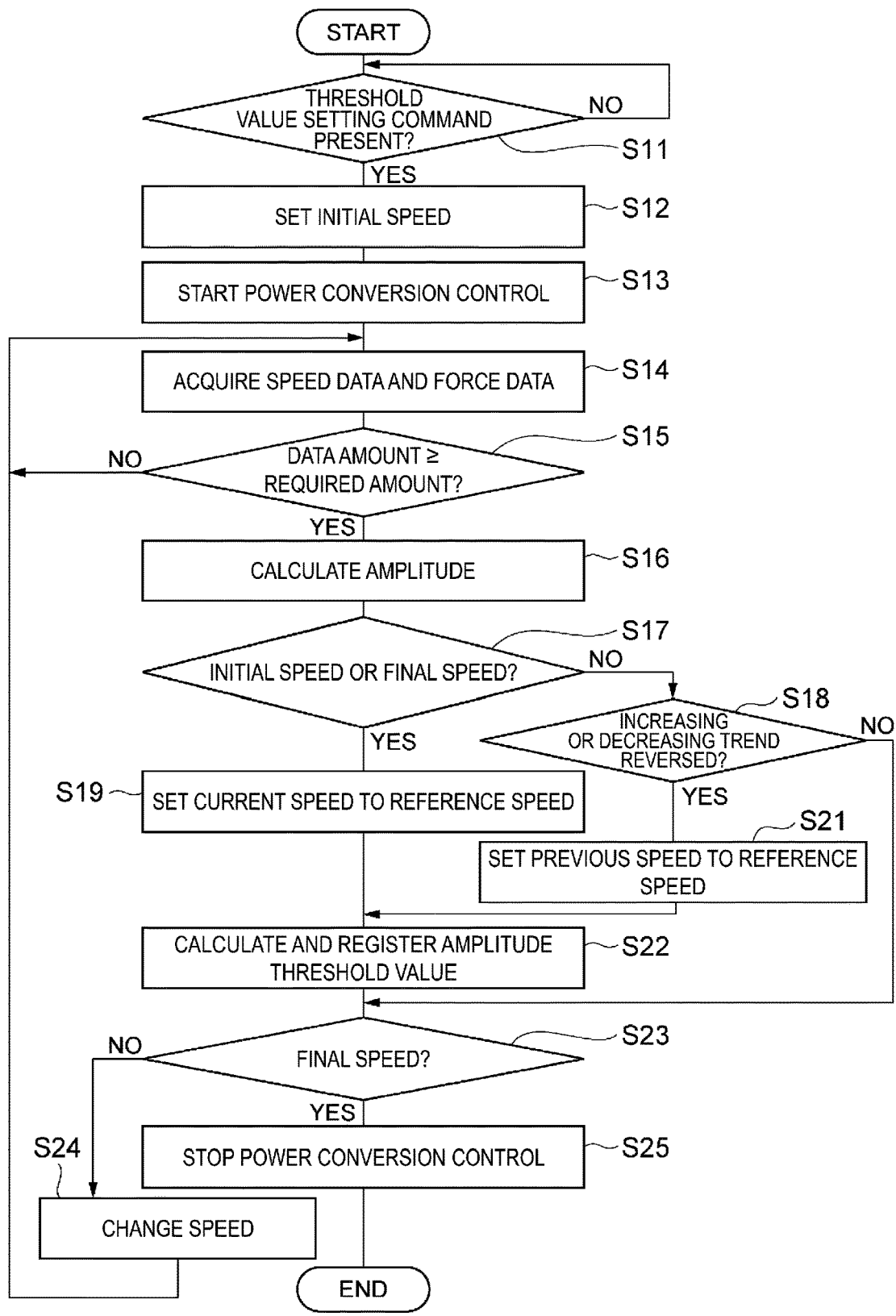
FIG. 6 is a flowchart illustrating a setting procedure of a threshold value profile.

As illustrated in FIG. 6, the control circuit 100 first executes steps S11, S12, S13, S14, S15. In step S11, the power conversion control unit 111 waits for input of a setting command for the amplitude threshold value profile. The setting command may be input by the upper controller 300, or may be input directly to the control circuit 100 by the user. In step S12, the power conversion control unit 111 sets the speed command to an initial speed. The initial speed is, for example, the minimum speed of the speed range in the setting conditions stored by the setting condition storage unit 122.

In step S13, the power conversion control unit 111 starts controlling the power conversion circuit 40 so as to cause the secondary power to follow the control command on the basis of the detected values of the current sensors 45U, 45V, 45W. In step S14, the data acquisition unit 113 acquires the force data described above and the speed data described above from the power conversion control unit 111 and saves the data in the operation data storage unit 114. In step S15, the amplitude calculation unit 115 checks whether the amount of force data saved in the operation data storage unit 114 has reached the amount required for evaluation of the amplitude of the driving force.

In a case in which it is determined in step S15 that the amount of force data has not reached the amount required to evaluate the amplitude of the driving force, the control circuit 100 returns the process to step S14. Thereafter, the acquisition and the saving of the force data and the speed data are repeated until the amount of force data required to evaluate the amplitude of the driving force is accumulated in the operation data storage unit 114.

In a case in which it is determined in step S15 that the amount of force data has reached the amount required to evaluate the amplitude of the driving force, the control circuit 100 executes steps S16, S17. In step S16, on the basis of the data stored by the operation data storage unit 114, the amplitude calculation unit 115 evaluates the driving force, and calculates the normal amplitude described above. In step S17, the threshold value calculation unit 116 checks whether the current speed (speed data acquired in the immediately preceding step S14) is the initial speed or a final speed. The final speed is, for example, the maximum speed in the speed range in the setting condition stored by the setting condition storage unit 122.

When it is determined in step S17 that the current speed is neither the initial speed nor the final speed, the control circuit 100 executes step S18. In step S18, the threshold value calculation unit 116 checks whether the increasing or decreasing trend described above was reversed at the current speed. For example, the threshold value calculation unit 116 determines that the increasing or decreasing trend described above was reversed when the positive/negative state is reversed between a difference between the current normal amplitude (normal amplitude calculated in the immediately preceding step S16) and the previous normal amplitude (amplitude calculated in the previous step S16), and a difference between the previous normal amplitude and the normal amplitude before the previous normal amplitude (the amplitude calculated in the step S16 before the immediately preceding step S16).

In a case in which it is determined in step S17 that the current speed is the initial speed or the final speed, the control circuit 100 executes step S19. In step S19, the threshold value calculation unit 116 sets the current speed to the reference speed described above.

In a case in which it is determined in step S18 that the increasing or decreasing trend was reversed at the current speed, the control circuit 100 executes step S21. In step S21, the threshold value calculation unit 116 sets the previous speed (speed data acquired in the previous step S14) as the reference speed described above.

Next, the control circuit 100 executes step S22. In step S22, on the basis of the normal amplitude corresponding to the reference speed and the calculation criteria in the setting conditions stored by the setting condition storage unit 122, the threshold value calculation unit 116 calculates the amplitude threshold value corresponding to the reference speed, and saves the value in the threshold value storage unit 117 in association with the reference speed. Note that the normal amplitude corresponding to the reference speed refers to the normal amplitude calculated by the amplitude calculation unit 115 when the speed data matches the reference speed.

Next, the control circuit 100 executes step S23. In a case in which it is determined in step S18 that the increasing or decreasing trend has not been reversed at the current speed, the control circuit 100 executes step S23 without executing steps S19, S21, S22. In step S23, the power conversion control unit 111 checks whether the current speed is the final speed. In a case in which it is determined in step S23 that the current speed is not the final speed, the control circuit 100 executes step S24. In step S24, the power conversion control unit 111 changes the speed command. For example, the power conversion control unit 111 adds a predetermined speed increase pitch to the current speed command. Subsequently, the control circuit 100 returns the processing to step S14. Thereafter, the setting process of the amplitude threshold value profile continues until the current speed reaches the final speed.

In a case in which it is determined in step S23 that the current speed is the final speed, the control circuit 100 executes step S25. In step S25, the power conversion control unit 111 stops the control that causes the secondary power to follow the control command by the power conversion circuit 40. Thus, the setting procedure of the amplitude threshold value profile is completed.

Pump Operation Procedure

Figure 7:
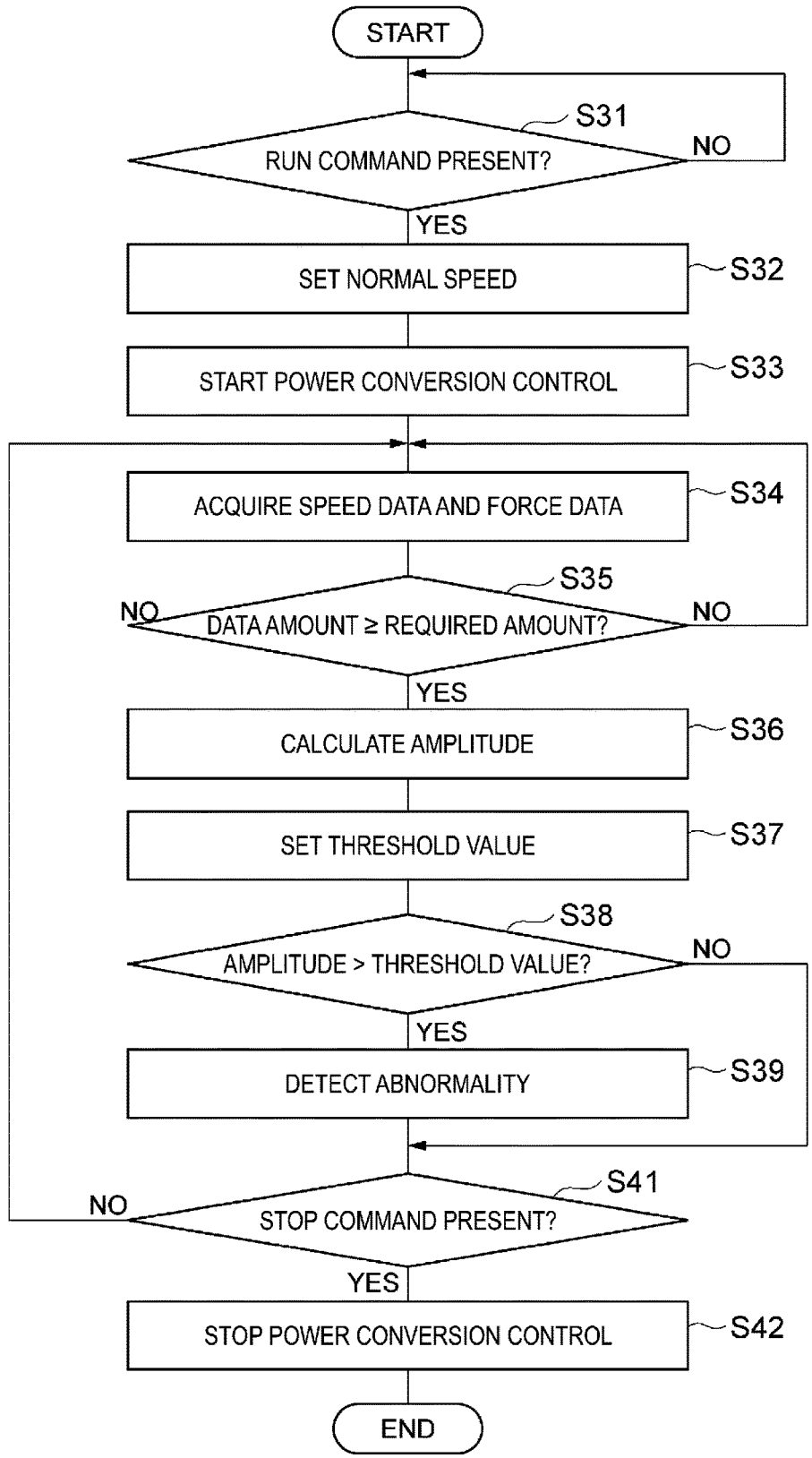
FIG. 7 is a flowchart illustrating an operation procedure of a pump.

As illustrated in FIG. 7, the control circuit 100 first executes steps S31, S32, S33, S34, S35. In step S31, the power conversion control unit 111 waits for input of a run command for the pump 20. The run command may be input by the upper controller 300, or may be input directly to the control circuit 100 by the user. In step S32, the power conversion control unit 111 sets the speed command to the normal speed. The normal speed is preset for normal operation.

In step S33, the power conversion control unit 111 starts controlling the power conversion circuit 40 so as to cause the secondary power to follow the control command on the basis of the detected values of the current sensors 45U, 45V, 45W. In step S34, the data acquisition unit 113 acquires the force data described above and the speed data described above from the power conversion control unit 111 and saves the data in the operation data storage unit 114. In step S35, the amplitude calculation unit 115 checks whether the amount of force data saved in the operation data storage unit 114 has reached the amount required for evaluation of the amplitude of the driving force.

In a case in which it is determined in step S35 that the amount of force data has not reached the amount required to evaluate the amplitude of the driving force, the control circuit 100 returns the process to step S34. Thereafter, the acquisition and the saving of the force data and the speed data are repeated until the amount of force data required to evaluate the amplitude of the driving force is accumulated in the operation data storage unit 114.

In a case in which it is determined in step S35 that the amount of force data has reached the amount required to evaluate the amplitude of the driving force, the control circuit 100 executes steps S36, S37, S38. In step S36, on the basis of the data stored by the operation data storage unit 114, the amplitude calculation unit 115 evaluates the amplitude of the driving force. Hereinafter, the evaluation result of the amplitude in step S36 is referred to as "current amplitude."

In step S37, on the basis of the current speed and the amplitude threshold value profile stored by the threshold value storage unit 117, the abnormality detection unit 118 sets the amplitude threshold value (hereinafter referred to as "current amplitude threshold value"). In step S38, the abnormality detection unit 118 checks whether the current amplitude exceeds the current amplitude threshold value.

In a case in which it is determined in step S38 that the current amplitude exceeds the current amplitude threshold value, the control circuit 100 executes step S39. In step S39, the abnormality detection unit 118 detects an abnormality in the pump 20, and outputs the detection result to the upper controller 300, the display device, or the like.

Next, the control circuit 100 executes step S41. In a case in which it is determined in step S38 that the current amplitude does not exceed the current amplitude threshold value, the control circuit 100 executes step S41 without executing step S39. In step S41, the power conversion control unit 111 checks whether there is a stop command for the pump 20. The stop command may be input by the upper controller 300, or may be input directly to the control circuit 100 by the user.

In a case in which it is determined in step S41 that there is no stop command for the pump 20, the control circuit 100 returns the process to step S14. Thereafter, the power conversion control and the monitoring of the amplitude continue until a stop command is input.

In a case in which it is determined in step S41 that there is a stop command for the pump 20, the control circuit 100 executes step S42. In step S42, the power conversion control unit 111 stops the control that causes the secondary power to follow the control command by the power conversion circuit 40. Thus, the operation procedure of the pump is completed.

Effects of the Present Embodiment

As described above, the power conversion device 30 includes the power conversion circuit 40 configured to convert primary power to secondary power and supply the secondary power to the pump 20, and the control circuit 100 configured to cause the secondary power to follow the control command by the power conversion circuit 40. The control circuit 100 is configured to further execute evaluating, on the basis of the secondary power, an amplitude of the driving force of the pump 20, setting, on the basis of a relationship between an evaluation result of the amplitude and the driving speed of the pump 20, an amplitude threshold value profile indicating a relationship between the amplitude threshold value and the driving speed, and detecting an abnormality in the pump 20 in response to the evaluation result of the amplitude exceeding the amplitude threshold value based on the amplitude threshold value profile.

According to this power conversion device 30, the amplitude threshold value profile is set on the basis of the relationship between the evaluation result described above and the driving speed, and an abnormality in the pump 20 is detected in response to the evaluation result of the amplitude exceeding the amplitude threshold value based on the amplitude threshold value profile. As a result, it is possible to improve a detection sensitivity of an abnormality at a driving speed at which the amplitude of the driving force is small while suppressing erroneous detection of an abnormality at a driving speed at which the amplitude of the driving force is large. In this way, the power conversion device 30 detects abnormalities while both suppressing erroneous detection and improving detection sensitivity, making it possible to simplify a configuration for detecting an abnormality in the pump 20.

The control circuit 100 may be configured to further execute setting calculation criteria of the amplitude threshold value based on the evaluation result of the amplitude for each of the driving speeds on the basis of a user setting, and may set the amplitude threshold value profile on the basis of the evaluation result of the amplitude for each of the driving speeds and the calculation criteria for each of the driving speeds. In this case, the amplitude threshold value profile is set on the basis of both the evaluation result of the amplitude and the user setting, making it possible to perform abnormality detection consistent with user needs.

The control circuit 100 may set the amplitude threshold value profile by adding a margin that changes in accordance with the driving speed to the evaluation result of the amplitude. In this case, both suppression of erroneous detection and improvement in detection sensitivity can be more reliably achieved.

The control circuit 100 may set the amplitude threshold value profile by multiplying the evaluation result of the amplitude by a magnification that changes in accordance with the driving speed. In this case, both suppression of erroneous detection and improvement in detection sensitivity can be more reliably achieved.

The control circuit 100 may set, as the amplitude threshold value profile, a plurality of amplitude threshold values respectively corresponding to a plurality of reference speeds and, when the driving speed is positioned between two of the reference speeds, calculate an amplitude threshold value corresponding to the driving speed by interpolation of the two amplitude threshold values respectively corresponding to the two reference speeds. In this case, the number of data points in the amplitude threshold value profile can be reduced.

The control circuit 100 may evaluate an amplitude of the driving force while increasing the driving speed, and set at least one of the plurality of reference speeds by setting, as the reference speed, the driving speed when an increasing or decreasing trend in the evaluation result of the amplitude in accordance with the increase in the driving speed is reversed. In this case, it is possible to both adapt the amplitude threshold value profile to the relationship between the evaluation result of the amplitude and the driving speed, and reduce the number of data points described above.

The control circuit 100 may acquire force data indicating the driving force on the basis of the secondary power, and evaluate the amplitude of the driving force on the basis of an amplitude of the force data. In this case, the amplitude of the driving force can be derived with high reliability.

The control circuit 100 may be configured to further execute calculating, as the amplitude of the driving force, a difference between the driving force and a trend value of the driving force based on a plurality of values of the driving force acquired from a predetermined time before an acquisition time of the driving force to the acquisition time. In this case, an abnormality in the pump 20 can be quickly detected even in a situation in which an abnormality suddenly occurs or the like.

Figure 8:
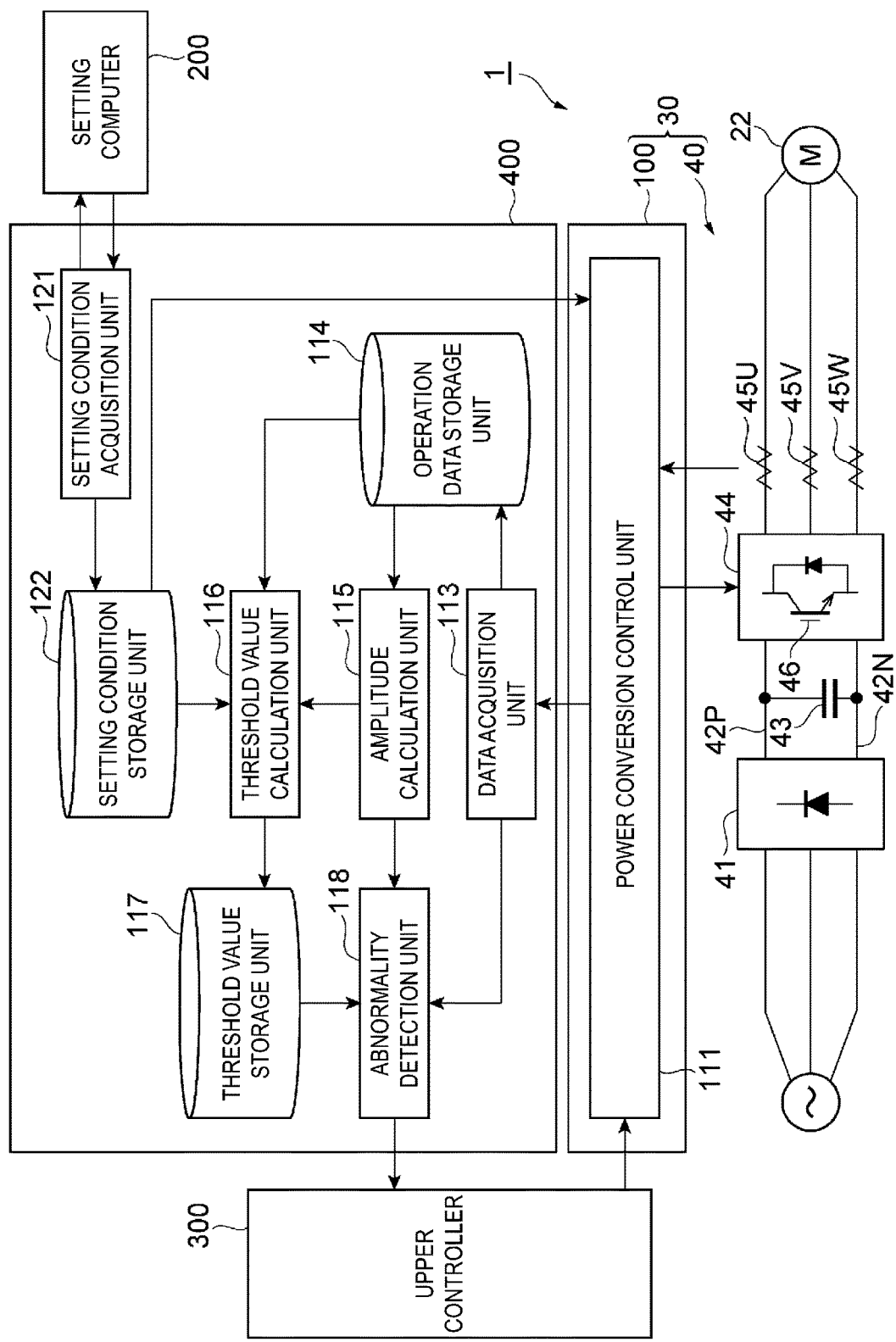
FIG. 8 is a block diagram illustrating a modified example of a diagnosis device.

An embodiment has been described above. However, the disclosure is not necessarily limited to the embodiment described above, and various modifications are possible without departing from the gist of the disclosure. In the embodiment described above, a configuration has been illustrated in which a diagnosis device is incorporated into the control circuit 100 of the pressure feed device 1, the diagnosis device being configured to execute a diagnosis procedure including evaluating, on the basis of power supplied to the pump 20 by the power conversion circuit 40, an amplitude of the driving force of the pump 20, setting, on the basis of a relationship between an evaluation result of the amplitude and a driving speed of the pump 20, an amplitude threshold value profile indicating a relationship between an amplitude threshold value and the driving speed, and detecting an abnormality in the pump 20 in response to the evaluation result of the amplitude exceeding the amplitude threshold value based on the amplitude threshold value profile. However, the diagnosis device may be provided outside the control circuit 100. For example, a diagnosis device 400 illustrated in FIG. 8 is configured outside the control circuit 100, and includes the data acquisition unit 113, the operation data storage unit 114, the amplitude calculation unit 115, the threshold value calculation unit 116, the threshold value storage unit 117, the abnormality detection unit 118, the setting condition acquisition unit 121, and the setting condition storage unit 122. The diagnosis device may be incorporated into the upper controller 300. Further, the driven object of an electrically powered type is not limited to the pressure feed device 1. The driven object of an electrically powered type may be an object that uses an electrically powered motor as a power source, such as a fan or an agitator. Further, the motor itself may be the driven object of an electrically powered type.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A power conversion device comprising:
a power conversion circuit configured to convert primary power to secondary power and supply the secondary power to a driven object; and,
a control circuit configured to cause the secondary power to follow a control command by the power conversion circuit, wherein the control circuit is configured to further execute evaluating, on the basis of the secondary power, an amplitude of a driving force of the driven object, setting, on the basis of a relationship between an evaluation result of the amplitude and a driving speed of the driven object, an amplitude threshold value profile indicating a relationship between an amplitude threshold value and the driving speed, and detecting an abnormality in the driven object in response to the evaluation result of the amplitude exceeding the amplitude threshold value profile, wherein the control circuit is configured to further execute setting calculation criteria of the amplitude threshold value based on the evaluation result of the amplitude for each of the driving speeds on the basis of a user setting, and sets the amplitude threshold value profile on the basis of the evaluation result of the amplitude for each of the driving speeds and the calculation criteria for each of the driving speeds.

2. The power conversion device according to claim 1, wherein the control circuit sets the amplitude threshold value profile by multiplying the evaluation result of the amplitude by a magnification that changes in accordance with the driving speed.

3. A power conversion device comprising:
a power conversion circuit configured to convert primary power to secondary power and supply the secondary power to a driven object; and, a control circuit configured to cause the secondary power to follow a control command by the power conversion circuit, wherein the control circuit is configured to further execute evaluating, on the basis of the secondary power, an amplitude of a driving force of the driven object, setting, on the basis of a relationship between an evaluation result of the amplitude and a driving speed of the driven object, an amplitude threshold value profile indicating a relationship between an amplitude threshold value and the driving speed, and detecting an abnormality in the driven object in response to the evaluation result of the amplitude exceeding the amplitude threshold value based on the amplitude threshold value profile,
wherein the control circuit sets the amplitude threshold value profile by adding a margin that changes in accordance with the driving speed to the evaluation result of the amplitude.

4. A power conversion device comprising:
a power conversion circuit configured to convert primary power to secondary power and supply the secondary power to a driven object; and, a control circuit configured to cause the secondary power to follow a control command by the power conversion circuit, wherein the control circuit is configured to further execute evaluating, on the basis of the secondary power, an amplitude of a driving force of the driven object, setting, on the basis of a relationship between an evaluation result of the amplitude and a driving speed of the driven object, an amplitude threshold value profile indicating a relationship between an amplitude threshold value and the driving speed, and detecting an abnormality in the driven object in response to the evaluation result of the amplitude exceeding the amplitude threshold value based on the amplitude threshold value profile,
wherein the control circuit sets, as the amplitude threshold value profile, a plurality of the amplitude threshold values respectively corresponding to a plurality of reference speeds and, when the driving speed is positioned between two of the reference speeds, calculates the amplitude threshold value corresponding to the driving speed by interpolation of the two amplitude threshold values respectively corresponding to the two reference speeds.

5. The power conversion device according to claim 4, wherein the control circuit evaluates an amplitude of the driving force while increasing the driving speed, and sets at least one of the plurality of reference speeds by setting, as the reference speed, the driving speed when an increasing or decreasing trend in the evaluation result of the amplitude in accordance with the increase in the driving speed is reversed.

6. A power conversion device comprising:
a power conversion circuit configured to convert primary power to secondary power and supply the secondary power to a driven object; and, a control circuit configured to cause the secondary power to follow a control command by the power conversion circuit, wherein the control circuit is configured to further execute evaluating, on the basis of the secondary power, an amplitude of a driving force of the driven object, setting, on the basis of a relationship between an evaluation result of the amplitude and a driving speed of the driven object, an amplitude threshold value profile indicating a relationship between an amplitude threshold value and the driving speed, and detecting an abnormality in the driven object in response to the evaluation result of the amplitude exceeding the amplitude threshold value based on the amplitude threshold value profile,
wherein the control circuit acquires force data indicating the driving force on the basis of the secondary power, and evaluates the amplitude of the driving force on the basis of a difference between the force data and a trend value of a plurality of the force data acquired from a predetermined time before an acquisition time of the force data to the acquisition time.

* * * * *